Feb. 15, 1955 P. M. FONTAINE 2,702,187
WEIGHING SCALE
Filed Oct. 13, 1948 3 Sheets-Sheet 1
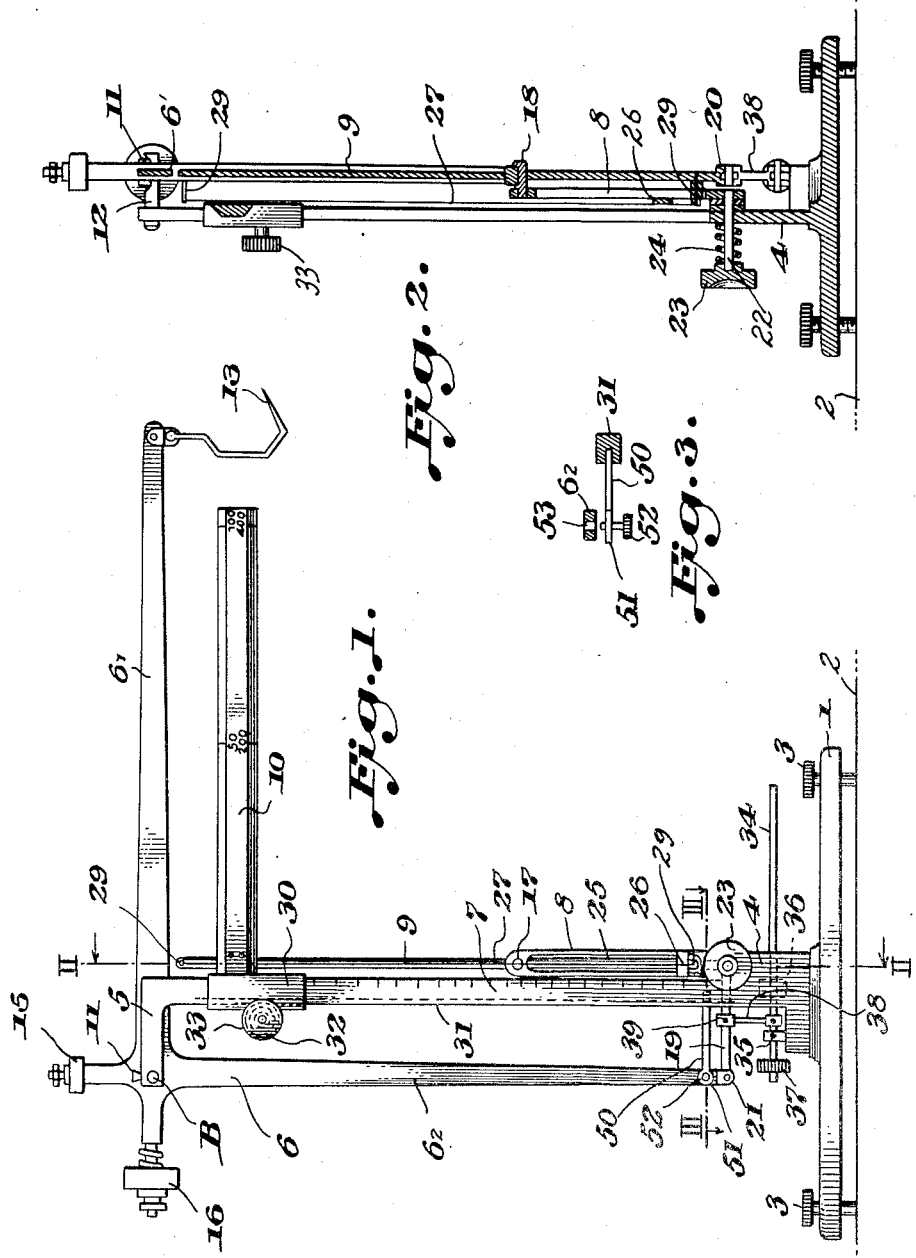
INVENTOR
P. M. Fontaine
BY Wenderoth, Lind & Ponack
ATTORNEYS Feb. 15, 1955 P. M. FONTAINE 2,702,187
WEIGHING SCALE
Filed Oct. 13, 1948 3 Sheets-Sheet 2
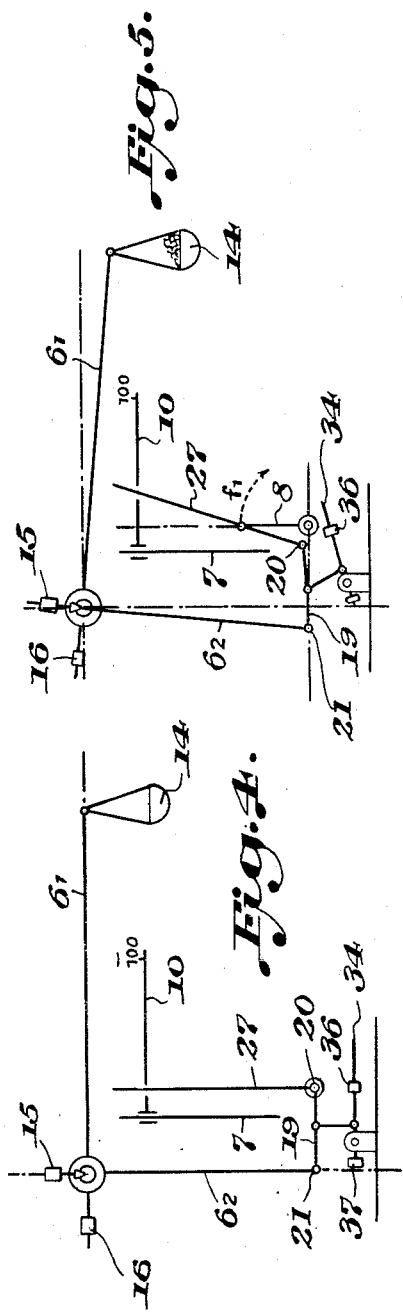
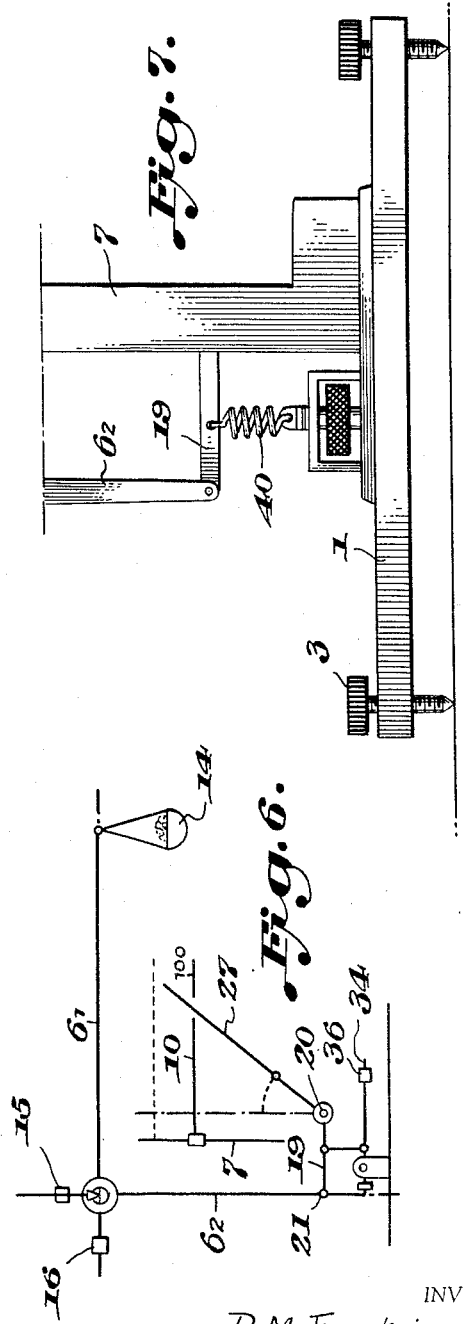
INVENTOR
P. M. Fontaine
BY Wenderoth, Lind & Ponack
ATTORNEYS Feb. 15, 1955     P. M. FONTAINE     2,702,187
WEIGHING SCALE
Filed Oct. 13, 1948     3 Sheets-Sheet 3
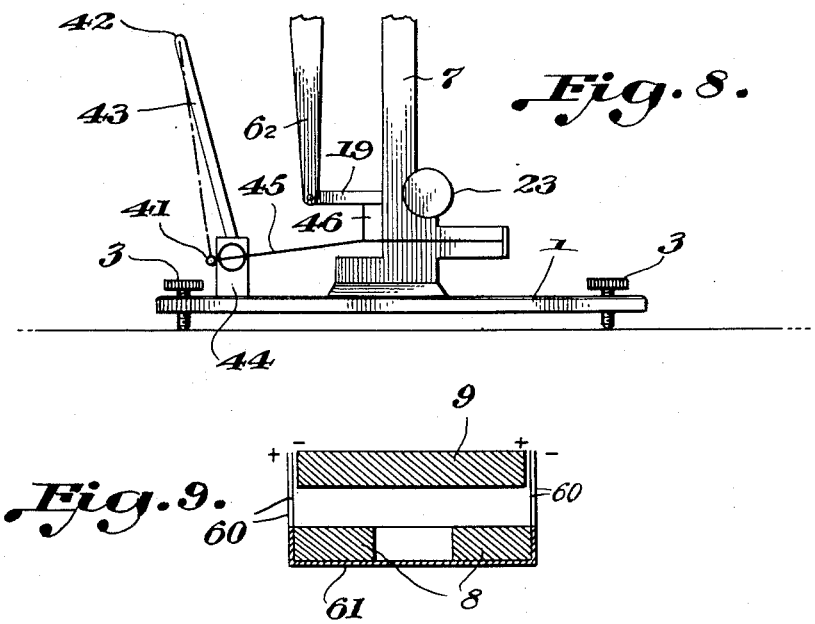
INVENTOR
P. M. Fontaine ást# United States Patent Office 2,702,187
Patented Feb. 15, 1955

2,702,187

WEIGHING SCALE

Pierre Marie Fontaine, Capinghem, France

Application October 13, 1948, Serial No. 54,286

Claims priority, application France October 25, 1947

4 Claims. (Cl. 265—49)

The invention relates to a weighing device of good sensitivity and usable over a wide range, the weighing device comprising a base or frame, a load supporting bar having horizontal and vertical arms which are perpendicular to each other, a first spindle and a knife edge mounted thereon for supporting the load supporting bar at the juncture of the two arms to balance the same, a second spindle which is parallel to the supporting spindle and which serves as a pointer arm to move in front of a scale mounted on said first spindle, a crank arm which is pivotally mounted on said first spindle and connected to said second spindle to effectively support the second spindle by means of a lever connection to the vertical arm of the load supporting bar.

The weighing device of the present invention may be used to measure other forces such as encountered in the measurement of pressure and tension. The weighing device will be further described with reference to the appended drawings it being understood that the following description and illustration are merely illustrative of the invention.

In the drawings:

Fig. 1 is an elevation view showing a form of weighing scale according to the invention.

Fig. 2 is a view along section line II—II of Fig. 1.

Fig. 3 is a sectional view through line III—III of Fig. 1 showing the stop device.

Figs. 4, 5 and 6 are diagrammatical views showing the positions occupied by the weighing scale during operation.

Figs. 7 and 8 are elevation views showing modifications of the calibration device.

Fig. 9 is a sectional view showing a modification of the crank arm provided with eelctrical contacts.

The weighing scale shown in its entirety in Figs. 1 and 2 essentially comprises a flat base or frame 1 resting upon a horizontal plane surface 2 on four screws 3, whereby the horizontal plane of the base 1 may be adjusted.

Secured to the center of base 1 in a vertical position is a rigidly secured first spindle 4; said spindle supports:

(1) On its upper horizontal projecting portion 5 the load supporting bar 6.

(2) The crank arm 8 at the lower straight part 7 of the first spindle 4 and at the end of which crank arm a second vertical spindle 9 is rockably mounted; and (3) The reading scale 10 sliding on the lower straight part 7 of the spindle 4.

The load supporting bar 6 is formed of two arms $6^1$, $6^2$ forming an angle of 90 degrees between them, one of said two arms being horizontal when the bar is in balance and acting to hold the load being weighed, while the other of the two arms points downwards towards the base. The bar 6 is rockably mounted around a horizontal axis B which consists of a knife edge 11 resting in the V-shaped notch of a stud 12.

The horizontal arm $6^1$ of the bar 6 is provided at its end with a hook 13 for the suspension of the load or of a scale pan 14, as shown in Figs. 4 to 6.

Adjustable counterweights 15, 16 balance each arm of load supporting bar 6 for placing the scale in balance.

A stop makes it possible to lock said bar 6 in the balance position of the system, said balance being obtained when the arms $6^1$, $6^2$ of bar 6 are respectively horizontal and vertical. Said stop may be made, for example, in the following manner:

A rod 50 is screwed in the base of the lower straight portion of the spindle 4, and terminates in an eyelet 51 in which a member 52 is located which can be pushed at will and which engages vertical arm $6^2$ by being inserted in a hole 53 of the latter.

The second spindle 9 is rockably mounted at the upper end of the crank arm 8 by a knife device 17 resting in the V-shaped notch of a stud 18 as shown in Fig. 2.

The second spindle 9 is connected to the vertical arm $6^2$ at a point adjacent the bottom end of the bar $6^2$ by a connecting link 19 pivotally secured on the one hand at 20 at the lower end of spindle 9, and on the other hand at 21 at the lower end of the vertical arm $6^2$ of load supporting bar 6 (Fig. 5).

The crank arm 8 is secured to a rockably mounted shaft 22 to the end of which a knurled actuating button 23 is secured. A compression spring 24 fitted around said shaft 22 and interposed between first spindle 4 and the knurled button 23 gives a gentle and constant braking action which makes it possible to stop the crank arm 8 in any angular position. A stop, not shown, determines the initial vertical position of the crank arm.

An elongated slot 25 is provided in the crank arm 8, open at its lower end, in order to make possible the passage of the reading wire 27, which is stretched between two pins 29 fastened to the second spindle 9, over a marker 26 sliding in slot 25.

The reading scale 10 consists of a beveled rule regularly graduated from zero to 100 on one bevel and from zero to 400 on the other bevel. Said rule is mounted on and tightly secured to slide 30.

In the example shown in Fig. 1 the vertical portion 7 of the first spindle 4 is provided with a rack 31 engaged by a pinion 32 which is secured to slide 30, which rack and pinion is actuated by a knurled button 33. The vertical portion 7 of the first spindle 4 can be provided advantageously with graduations making it possible to mark the positions taken by the reading scale.

The weighing scale comprises, besides the above described members, a calibration device acting upon the connecting link 19 through a rod 38 pivotally secured to said connecting link 19 at 39 midway of its length.

Said calibration device consists of a lever 34 of the second class linked in a bracket 35 and upon which lever a small block 36 slides.

In its position of rest (Fig. 1) said block 36 is balanced by a counterweight 37.

The calibration device, the purpose of which is to develop a force which can easily be adjusted, can consist of any suitable means, but more particularly (Fig. 7) of a traction spring 40 by which the connecting link 19 is connected with the base or frame 1, and the tension of which can be adjusted by means of a screw.

According to another modification (Fig. 8) the calibration device consists of a swinging mass 41 rocking around an axis 42 carried by a crank arm 43 pivoted in a bracket 44 fast with base 1.

Said swinging mass 41 is connected to a string 45, the other end of which is secured to the lower portion 7 of first spindle 4. Intermediate of its ends, string 45 is connected to link 19 by member 46. The tension imparted to string 45 by swinging mass 41 rocking about axis 42 is thus imparted to link 19, and may be varied by moving crank arm 43.

It is to be noted that the weighing device has the load supporting bar 6, second spindle 9 and connecting piece 19 and the calibration means all in the same plane as shown in Fig. 2.

On the other hand, the second spindle 9 and its crank arm 8 and the reading rule 10 are located in the angular space determined by the arms $6^1$, $6^2$ of the load supporting bar 6.

In operation, frame or base 1 of the weighing scale is placed on a perfectly horizontal surface, or said frame or base is adjusted by screws 3 to be in the proper horizontal position.

To set the weighing scale in a balanced position, the crank arm is brought to a vertical position against the stop not shown (Figs. 1 and 4). In this position the reading wire 27 of the second spindle 9 must register with the zero of the scale 10 and with the marker line 26; if not, the position is corrected by displacing the counterweight 16 of the load supporting arm 6 by acting upon the adjustment screw of said counterweight.

Scale 10 can lie at any height on the vertical portion 7 of the spindle 4 but it lies preferably opposite a mark of the graduation of the latter.

The apparatus is now adjusted according to a standard which can be a unit of any measuring system.

The load supporting bar 6 is locked in balanced position by stop 52, and a weight, e. g. of 10 kg, is suspended from hook 13. Crank arm 8, second spindle 9 and wire 27 fixed thereto, are adjusted to a selected mark on reading scale 10, e. g. 80. The load supporting bar 6 is released, the second spindle 9 moves from its position of alignment with crank arm 8, and carries wire 27 with it. The second spindle 9 is deflected from the chosen mark as shown in Fig. 5. By tensioning the calibrating device, e. g. block 36, lever 34 and counterweight 37, second spindle 9 is caused to point again to the chosen mark, as in Fig. 6. This calibrates the apparatus. The 10 kg weight may now be replaced by the object to be weighed.

Obviously, by moving scale 10 vertically, e. g. to a point halfway down portion 7 of first spindle 4, the chosen mark to which the second spindle 9 will point will be half 80 or 40. Thus, the range of loads which can be weighed is doubled.

The above described weighing scale offers numerous advantages and more particularly allows the use of various measuring systems of any order of magnitude up to the limit of strength of the materials used for making the scale.

It is further possible to utilize the angle which is assumed by the second spindle as a reading needle or beam in order to compare loads in view of the angular displacement rather than in terms of the absolute weight units.

The scale can be used for other purposes and more particularly when suitably calibrated as a commercial weighing scale without weights and with a fixed scale graduated in units of weight. A modification of this latter scale is a scale for prices with two graduated scales one of which, the weight scale, is stationary while the other, the movable scale, which slides vertically, offers price reading.

With the spring calibration device and with suitable rocking axes it is possible to adapt the scale for measuring forces, pressures and the like, and it is more particularly possible to make a device for checking meters (pressure gauges, tension meters and the like).

In this latter case when the weighing scale is used as a tension meter it is possible to measure the oscillations of second spindle 9 as respects their amplitude when the crank arm 8 is placed in a middle position, it thus being possible to compare the amplitude of certain pressures.

Obviously by choosing suitable values or ranges for the scales on the reading scale 10 or the graduations on the portion 7 of first spindle 4, the range and accuracy of measurements to be made by the weighing scale may be greatly varied.

According to a last example of execution a switching of electric currents can be obtained by means of this weighing scale, either when second spindle 9 is in a position of balance or out of a position of balance.

Said switching can be established for multiple purposes in the following manner:

The second spindle 9 rocks in its position of balance between a double set of two flexible blades 60 which conduct the electric current as shown in Fig. 9; said blades 60 are insulated from one another and secured by pairs to each leg of a U-shaped piece 61 itself secured to the crank arm 8 in a point near marker 26.

When the second spindle 9 is out of balance it rests either on one or the other of both sets of two blades and switches on either of the electric currents which it is intended to use.

It is thus possible automatically to obtain any control for a given load or pressure or until said load or pressure is obtained or after said load or pressure have been obtained. This is useful in safety devices of any type.

I claim:

1. A weighing scale comprising a frame, a load supporting bar having a horizontal arm and a vertical arm which are perpendicular to each other, a first spindle secured to said frame, a horizontal portion extending from said spindle, a knife edge at the vertex of said horizontal and vertical arms for mounting said bar on the horizontally extending portion of said spindle, a second movable spindle parallel to the lower portion of the first spindle, a crank arm pivotally mounted at its lower end to the lower portion of said first spindle and at its upper end to said second spindle to move said second spindle as a pointer arm when a load is suspended from the end of the horizontal arm, a reading scale adjustably mounted on said first spindle which said second spindle may move, a connecting link pivotally mounted at one end to the lower end of the vertical arm of said bar and at the other end to the lower end of said second spindle whereby the downward movement due to weighting the end of the horizontal arm causes said second spindle to pivotally move about its pivot as a pointer to produce a reading on said reading scale.

2. A weighing scale comprising a frame, a load supporting bar having a horizontal arm and a vertical arm which are perpendicular to each other, a first spindle secured to said frame, a horizontal portion extending from said spindle, a knife edge at the vertex of said horizontal and vertical arms for mounting said bar on the horizontally extending portion of said first spindle, a second movable spindle parallel to the lower portion of the first spindle, a crank arm pivotally mounted at its lower end to the lower portion of said first spindle and at its upper end to said second spindle to move said second spindle as a pointer arm when a load is suspended from the end of the horizontal arm, a crank arm stop for stopping the crank arm, a reading scale adjustably mounted on said first spindle behind which said second spindle may move, an adjustably tensioned connecting link pivotally mounted at one end to the lower end of the vertical arm of said bar and at the other end to the lower end of said second spindle whereby the downward movement due to weighting the end of the horizontal arm causes said second spindle to pivotally move about its pivot as a pointer to produce a reading on said reading scale.

3. A weighing scale as in claim 2 wherein a marker is mounted on said crank arm and a wire is provided in front of said marker.

4. A weighing scale as in claim 2 wherein a lever pivotally mounted on said frame connects said connecting piece to said frame and an adjustable block is mounted on said lever on the side opposite the joining of said lever to said frame.

References Cited in the file of this patent

UNITED STATES PATENTS

| Number | Name | Date |
|---|---|---|
| 53,050 | Shepard | Mar. 6, 1866 |
| 340,012 | Springer | Apr. 13, 1886 |
| 373,568 | Richtmann | Nov. 22, 1887 |
| 1,433,436 | Voland | Oct. 24, 1922 |
| 1,551,726 | Birk | Sept. 1, 1925 |
| 1,567,224 | Baage | Dec. 29, 1925 |
| 1,650,228 | Mittendorf | Nov. 22, 1927 |
| 1,793,276 | Chott | Feb. 17, 1931 |
| 2,358,877 | Parks | Sept. 26, 1944 |

FOREIGN PATENTS

| Number | Country | Date |
|---|---|---|
| 658,360 | France | Jan. 25, 1929 |